United States Patent
Noh

(10) Patent No.: US 9,520,063 B2
(45) Date of Patent: Dec. 13, 2016

(54) PARKING CONTROL APPARATUS, PARKING CONTROL METHOD AND PARKING CONTROL SYSTEM

(71) Applicant: MANDO CORPORATION, Pyeongtaek-si, Gyeonggi-do (KR)

(72) Inventor: Tae Bong Noh, Yongin (KR)

(73) Assignee: Mando Corporation, Pyeongtaek-si, Gyeonggi-do (KR)

(*) Notice: Subject to any disclaimer, the term of this patent is extended or adjusted under 35 U.S.C. 154(b) by 0 days.

(21) Appl. No.: 14/306,901

(22) Filed: Jun. 17, 2014

(65) Prior Publication Data
US 2015/0054661 A1 Feb. 26, 2015

(51) Int. Cl.
G08G 1/14 (2006.01)

(52) U.S. Cl.
CPC .............. *G08G 1/141* (2013.01); *G08G 1/143* (2013.01); *G08G 1/146* (2013.01); *G08G 1/147* (2013.01)

(58) Field of Classification Search
CPC .......... G08G 1/14; G08G 1/141; G08G 1/143; G08G 1/146; G08G 1/147; G07B 15/02; B60T 2201/10; G06Q 30/0284; B62D 15/028
USPC ....... 340/435, 903, 932.2; 701/23, 400, 527; 180/272
See application file for complete search history.

(56) References Cited

U.S. PATENT DOCUMENTS

| | | | |
|---|---|---|---|
| 7,659,835 B2* | 2/2010 | Jung | 340/932.2 |
| 2005/0195095 A1* | 9/2005 | Kato | G08G 1/146 340/932.2 |
| 2005/0285758 A1* | 12/2005 | Matsukawa | B60W 10/06 340/932.2 |
| 2008/0136673 A1* | 6/2008 | Jung | 340/932.2 |
| 2009/0322565 A1* | 12/2009 | Faber | 340/932.2 |
| 2010/0017084 A1* | 1/2010 | Riegel | 701/70 |
| 2010/0060485 A1* | 3/2010 | Kim | G08G 1/14 340/932.2 |
| 2012/0062394 A1* | 3/2012 | Pampus et al. | 340/932.2 |
| 2012/0197492 A1* | 8/2012 | Schneider et al. | 701/41 |
| 2012/0200430 A1* | 8/2012 | Spahl | 340/932.2 |
| 2013/0166190 A1* | 6/2013 | Ikeda et al. | 701/400 |
| 2013/0229524 A1* | 9/2013 | Vovkushevsky | B60R 1/00 348/148 |
| 2013/0265429 A1* | 10/2013 | Yoon et al. | 348/148 |

FOREIGN PATENT DOCUMENTS

DE 10045616 A1 * 3/2002
DE 102010043742 A1 6/2012

* cited by examiner

*Primary Examiner* — Sisay Yacob
(74) *Attorney, Agent, or Firm* — McDermott Will & Emery LLP

(57) ABSTRACT

The present invention relates to a parking control technology. In particular, the present invention relates to a parking control apparatus, a parking control method, and a parking control system which may search a plurality of parking space around a vehicle and allocate identification information to each of the searched parking spaces.

5 Claims, 9 Drawing Sheets

PARKING CONTROL APPARATUS, PARKING CONTROL METHOD AND PARKING CONTROL SYSTEM

CROSS-REFERENCE TO RELATED APPLICATION

This application claims priority from and the benefit under 35 U.S.C. §119(a) of Korean Patent Application No. 10-2013-0100291, filed on Aug. 23, 2013, which is hereby incorporated by reference for all purposes as if fully set forth herein.

BACKGROUND OF THE INVENTION

1. Field of the Invention

The present invention relates to a parking control technology.

2. Description of the Prior Art

Conventionally, a parking control includes a parking space search procedure of searching a parking space to park a vehicle, a parking route calculation procedure of calculating a parking route to move the vehicle so as to park the vehicle in a target parking position based on the searched parking space, and a vehicle parking procedure of moving the vehicle along the calculated parking route so as to park the vehicle.

Such a conventional parking control does not fully inform a driver of a parking control situation or state. In particular, the conventional parking control is limited to a case where only one parking space is searched in the parking space search process. Thus, there is a problem in that the driver is not properly guided when a plurality of spaces are searched in the parking space search procedure.

SUMMARY OF THE INVENTION

In this background, an object of the present invention is to provide a parking control apparatus, a parking control method, and a parking control system which may guide a driver to a plurality of spaces searched in the parking space search procedure. In order to achieve the above-mentioned object, according to an aspect of the present invention, there is provided a parking control apparatus including a space search unit configured to search one or more spaces to park a vehicle; and a searched space management unit configured to allocate identification information to correspond to each of the searched spaces.

According to another aspect, the present invention provides a parking control method including: searching one or more spaces to park a vehicle; and allocating identification information to correspond to each of the searched spaces.

According to still another aspect, the present invention provides a parking control system including: a parking control apparatus configured to search one or more spaces to park a vehicle and to allocate identification information to correspond to each of the searched spaces; and a display apparatus configured to display the identification information allocated to correspond to each of the searched spaces.

BRIEF DESCRIPTION OF THE DRAWINGS

The above and other objects, features and advantages of the present invention will be more apparent from the following detailed description taken in conjunction with the accompanying drawings, in which:

FIGS. 4(A) and 4(B) to FIGS. 9(A) and 9(B) are views exemplifying parking situations and display apparatuses to which the parking control method according to the exemplary embodiment of the present invention is applied.

DETAILED DESCRIPTION OF THE EXEMPLARY EMBODIMENTS

Hereinafter, some exemplary embodiments of the present invention will be described in detail through illustrative drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
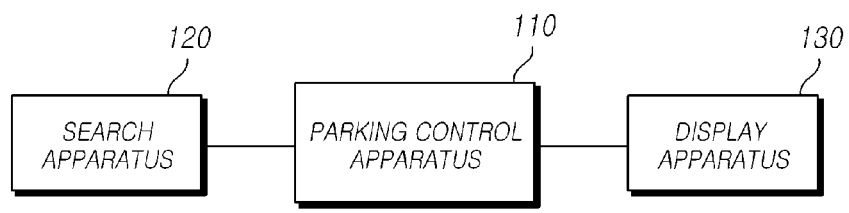
FIG. 1 is a block diagram illustrating a parking control system according to an exemplary embodiment of the present invention.

FIG. 1 is a block diagram illustrating a parking control system 100 according to an exemplary embodiment of the present invention.

Referring to FIG. 1, a parking control system 100 according to an exemplary embodiment of the present invention includes a search apparatus 120 configured to perform a search function of searching one or more spaces around a vehicle, a parking control apparatus 110 configured to allocate corresponding identification information to each of the spaces searched as a result of searching the spaces around the vehicle using the search apparatus 120 such that the identification information, and a display apparatus 130 configured to display the identification information allocated to correspond to each of the searched spaces.

The above-mentioned search apparatus 120 may be one of, for example, an ultrasonic wave sensor, a laser sensor, a radar, and a camera sensor.

When signals sent by the search apparatus 120 and reflected by an object existing around the vehicle are received by the search apparatus 120, the search apparatus 120 may sense a distance between the vehicle and the object, a position of the object or the like based on the received signals. Based on the distance or position of the object sensed in this manner, the search apparatus 120 or the parking control apparatus 110 may search a space to park the vehicle.

In other words, the parking control apparatus 110 may search a parkable space by sensing an object and a space around the vehicle through the search apparatus 120 such as a ultrasonic sensor, and control information for the searched space to be displayed on the display apparatus 130.

In addition, the parking control apparatus 110 may store sensing result information obtained by sensing the object and space around the vehicle through the search apparatus 120 such as a ultrasonic sensor (e.g., object information of a distance between the vehicle and the object, a position of the object or the like, and space information of a size and position of the space) in an internal or external memory.

Hereinafter, the parking control apparatus 110 briefly described above will be described in more detail with reference to FIG. 2.

Figure 2:
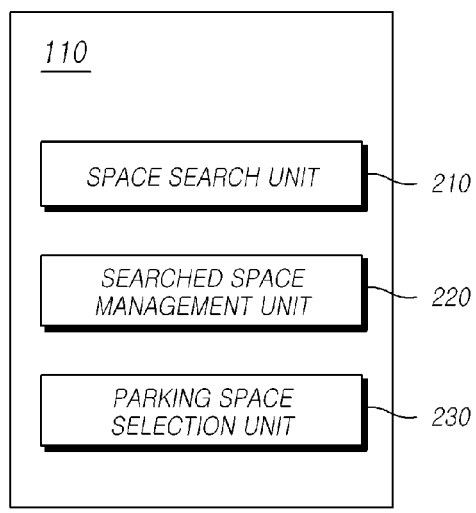
FIG. 2 is a block diagram illustrating a parking control apparatus according to an exemplary embodiment of the present invention.

FIG. 2 is a block diagram illustrating a parking control apparatus according to an exemplary embodiment of the present invention.

Referring to FIG. 2, according to the exemplary embodiment of the present invention, the parking control apparatus 110 includes a space search unit 210 configured to search one or more spaces to park a vehicle using the search apparatus 120, a searched space management unit 220 configured to allocate corresponding identification information to each of the spaces searched by the space search unit 210, and a parking space selection unit 230 configured to select one of the searched spaces as a parking space to actually park the vehicle.

The above-mentioned space search unit 210 recognizes an object existing around the vehicle through the search apparatus 120 and search a space to park the vehicle based on the object recognition result.

In connection with such a space search, when an object or objects (e.g., a parked vehicle, a column, a wall) is positioned on a left side and/or a right side of the vehicle equipped with the parking control system 100 including the parking control apparatus 110, the search apparatus 120, etc. and an empty space exists between the objects or adjacent to the object(s), the space search unit 210 of the parking control apparatus 110 in the parking control system 100 equipped in the vehicle may recognize the object(s) using the search apparatus 120 and search the space based thereon.

In connection with object recognition, while the vehicle equipped with the parking control system 100 moves in front of, behind or next to the object(s) existing on the left side and/or right side of the vehicle, the search apparatus 120 receives signals sent by the search apparatus 120 and reflected by the parked vehicles or the like. Then, the search apparatus 120 may analyze the received signals to find out object information such as a distance and a position of the object(s) around the vehicle. The space search unit 210 may recognize the object(s) around the vehicle through the object information obtained by the search apparatus 120 and may search an empty space between the objects or in the vicinity of the object(s) based on the recognized result.

At this time, when a space to park the vehicle is searched by the space search unit 210, but the vehicle passes by the searched space, the space search unit 210 may search another parkable space thereafter. Accordingly, the space search unit 210 can search a plurality of spaces, and then, the driver of the vehicle can select one of the searched spaces as a space to actually park the vehicle.

Meanwhile, in connection with the parking control, when parking-related guidance, such as where to park the vehicle and how to the vehicle, is provided by informing the driver of the space search result, the parking control situation, or the like, the driver's convenience may be improved.

An apparatus that displays information for such a parking-related guide is the display apparatus 130 of FIG. 1.

Meanwhile, the space search unit 210 may search one space or a plurality of spaces. When the plurality of spaces are searched, it may be necessary to provide a parking-related guide so as to assist the driver to discriminates between each of the searched spaces.

Accordingly, the searched space management unit 220 performs a control such that a space image for each of the spaces searched by the space search unit 210 is displayed on the display apparatus 130, and may perform a control such that the identification information allocated to correspond to each of the searched spaces is further displayed on the display apparatus 130. Here, the identification information allocated to correspond to each of the searched spaces may include at least one of, for example, a figure, a symbol, an image, and a color which are inherent to each of the searched spaces.

More specifically, the searched space management unit 220 may perform a control such that image information for each of searched spaces obtained by the space search unit 210 through the search apparatus 120 is displayed on the display apparatus 130, and may also perform a control such that at least one of the inherent figure, symbol, image and color is displayed as space identification information on the display apparatus 130 to be associated with the corresponding space image so that the plurality of searched spaces can be discriminated.

For example, when the space search unit 210 searches an empty space between Object 1 and Object 2 as Space 1 and an empty space between Object 2 and Object 3 as Space 2, the searched space management unit 220 may allocate an identification number of "#1" as the identification information of Space 1 and may perform a control such that the identification number of "#1" is displayed on the display apparatus 130. Following Space 1, the searched space management unit 220 may allocate an identification number of "#2" as the identification information for the searched Space 2 and may perform a control such that the identification number of "#2" is displayed on the display apparatus 130.

On the above-described display apparatus 130, identification information allocated to correspond to each of the space image and the searched space of each of the searched spaces is displayed. Further, an object image for an object recognized in the space search procedure (e.g. a parked vehicle image), various pieces of information related to a parking control (e.g., gear change guide information) may be additionally displayed. Meanwhile, when a plurality of spaces are searched by the space search unit 210, a function of selecting a parking space to actually park the vehicle among the plurality of searched spaces through the parking control is needed and this function is performed by the parking space selection unit 230.

The parking space selection unit 230 receives an input of driver selection information for one of the plurality of searched spaces displayed on the display apparatus 130 from the display apparatus 130 and selects a parking space to actually park the vehicle.

Meanwhile, when a space (Space 2) other than the space (Space 1) searched by the space search unit 210 is searched, the parking space selection unit 230 may suppress the searched space (Space 1) from being selected by the driver as a parking space.

Hereinafter, brief descriptions will be made on a parking control method provided by the parking control apparatus 110 according to exemplary embodiment of the present invention described with reference to FIG. 2.

Figure 3:
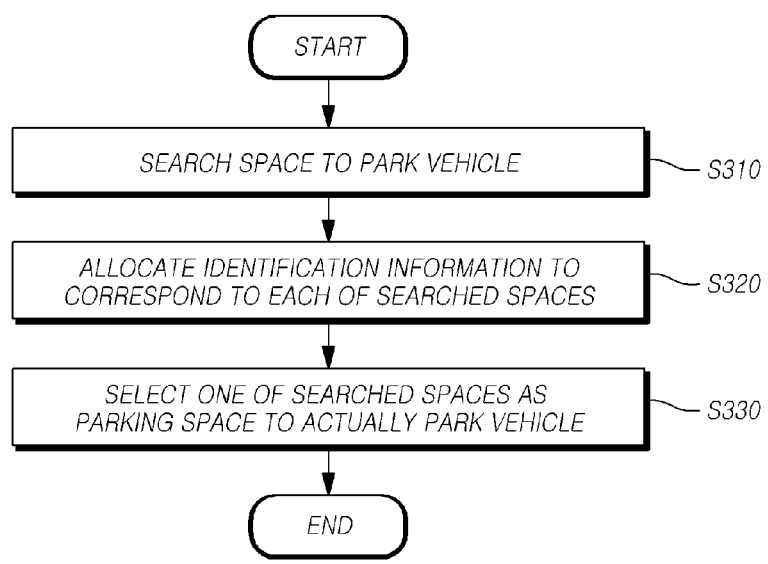
FIG. 3 is a flowchart illustrating a parking control method according to an exemplary embodiment of the present invention.
Figure 4:
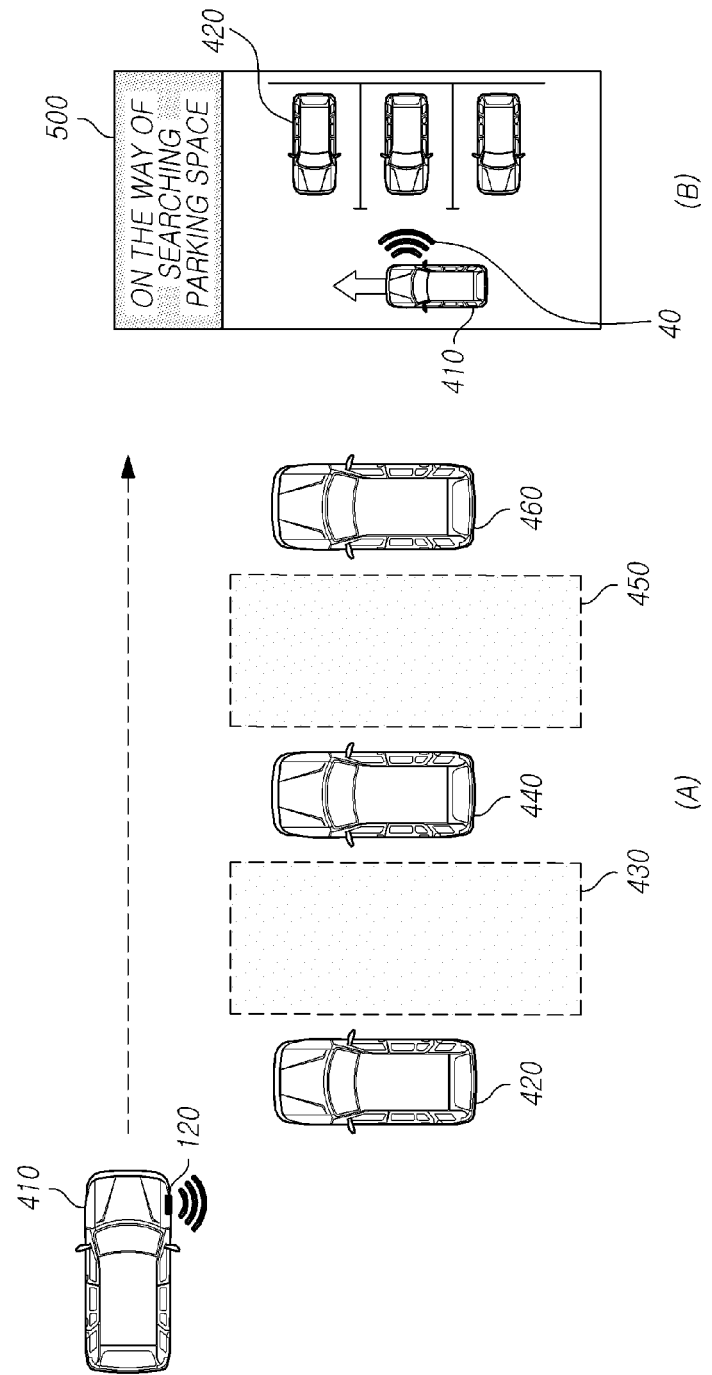
Figure 5:
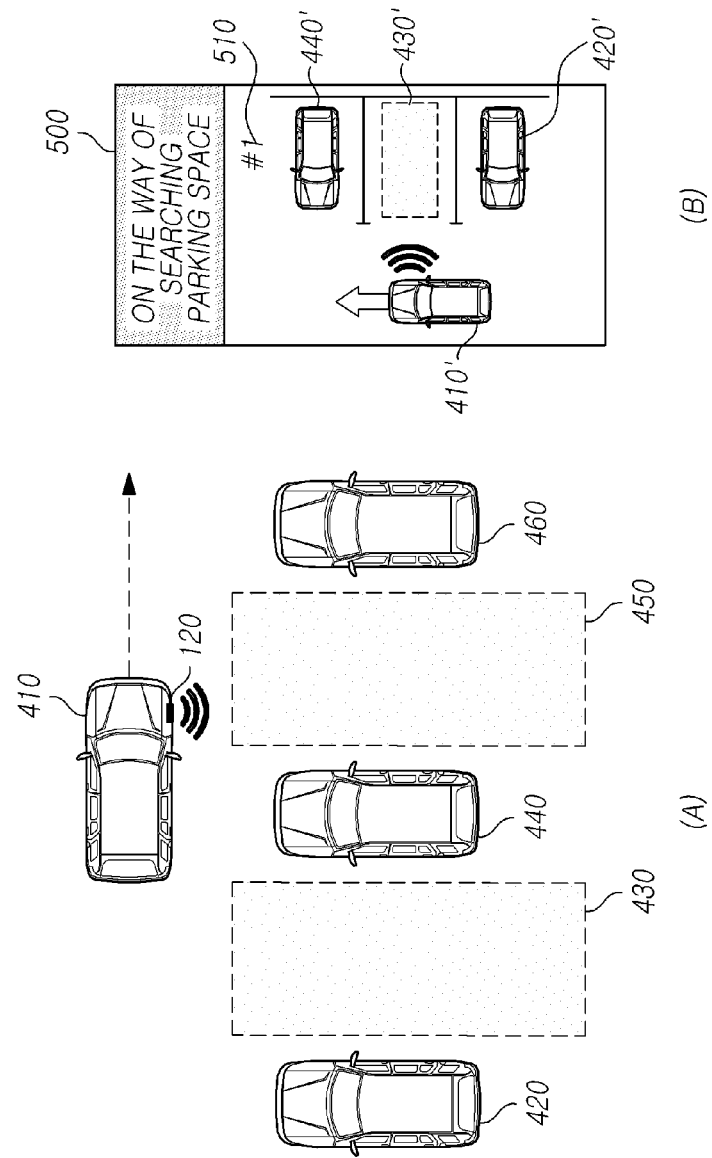
Figure 6:
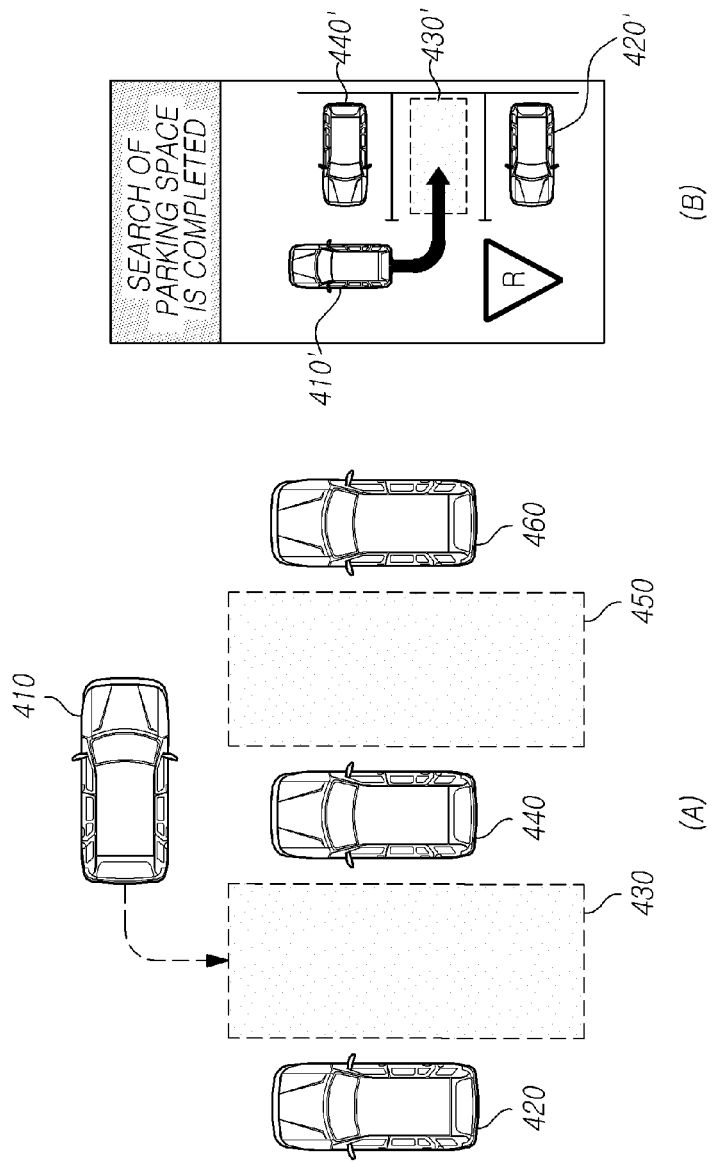
Figure 7:
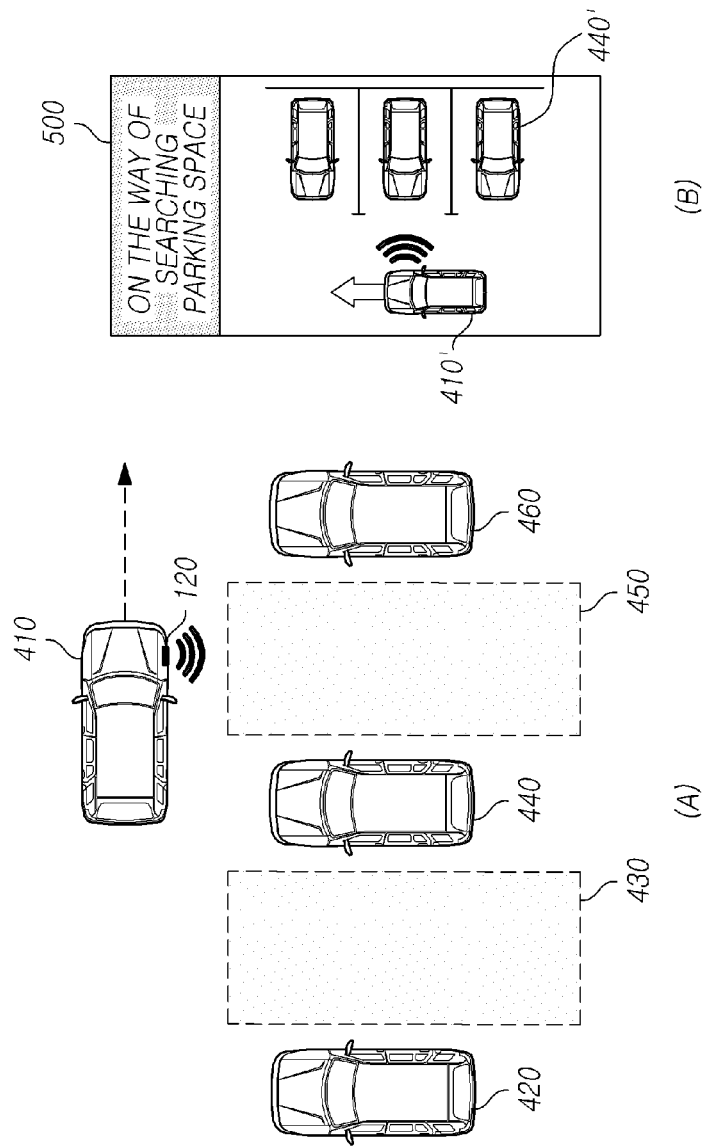

FIG. 3 is a flowchart illustrating a parking control method according to an exemplary embodiment of the present invention.

Referring to FIG. 3, according to the exemplary embodiment of the present invention, the parking control method includes searching one or more spaces to park a vehicle (S310), allocating corresponding identification information to each of the searched spaces (S320), and selecting one of the searched spaces as a parking space to actually park the vehicle (S330).

Hereinafter, descriptions will be made on the space search procedure according to the parking control method of the exemplary embodiment of the present invention described above and a method of displaying the information related to the space search (e.g., a space image, an object image, and space identification information) on a screen of the display apparatus 130 with reference to FIGS. 4 to 9 as examples.

Before description, an object image for an object existing around the vehicle equipped with the parking control system 100 and sensed by the search apparatus 120 may be basically displayed on the screen of the display apparatus 130, and a space image for a searched space and identification information corresponding thereto may be additionally displayed on the screen of the display apparatus 130.

Meanwhile, one or more image display regions capable of displaying an object image or space image may be provided on the screen of the display apparatus 130 in which the number of space images capable of being displayed on the screen and the number of pieces of identification information corresponding thereto may vary depending on the number of the image display regions which may be displayed on the screen.

For example, due to the limit of the size of the screen, the number of the image display regions capable of displaying an object image or a space image may be three. A screen display method for such a case will be described below.

When no searched space exists, three object images may be displayed on one screen.

When one space is searched, two object images, one space image, and identification information corresponding thereto may be displayed.

In a screen display method for a case when two or more searched spaces exist and the two or more spaces are sequentially searched, when one space (Space 1) is first searched among two or more spaces, two object images, the space image of the first searched space (Space 1), and identification information corresponding thereto may be displayed on one screen. Then, when another space (Space 2) is additionally searched following the first searched space (Space 1), according to a screen scroll method, the space image for the first searched space (Space 1) disappears from the screen, and a space image for the newly searched space (Space 2) and identification information corresponding thereto may be newly displayed. In this manner, following the searched space (Space 2), a space image for an additionally searched space and identification information corresponding thereto may be displayed on the screen.

However, in the following description, an object image will be referred to as a vehicle image, assuming that an object as an obstacle to parking the vehicle is a parked vehicle.

FIGS. 4(A) and 4(B) to FIGS. 9(A) and 9(B) are views exemplifying a screen of the display apparatus 130 which displays images for guiding a driver on a space search procedure according to a parking control method of an exemplary embodiment of the present invention (FIGS. 4(B) to 9(B)), and vehicle situations (FIGS. 4(A) to 9(A)), as examples.

Referring to FIGS. 4(A) and 4(B), a vehicle 410 equipped with the search apparatus 120 and the parking control apparatus 110 searches a parkable space in a parking situation where a plurality of parked vehicles 420, 440 and 460 and a plurality of empty spaces 430 and 450 between the plurality of parked vehicles exist (FIG. 4(A)).

At this time, the parking control apparatus 110, which is equipped in the vehicle 410 that searches a space to park it, performs a control such that image information of each of searched spaces obtained through the search apparatus 120 is displayed on a screen 500 of the display apparatus 130. When no parkable space is searched by the vehicle 410 and a search for a space to park the vehicle is continuously being performed, the parking control apparatus 110, which is equipped in the vehicle 410, performs a control such that only three object images 420, and an object image of the vehicle which is equipped with the search apparatus 120 to search the space are displayed on an image display region of the screen 500 of the display apparatus 130.

Here, the three object images 420 displayed on the image display region of the screen 500 of the display apparatus 130 may be images of the actually parked vehicles or images of objects recognized in the space search procedure.

Hereinafter, a situation in which the vehicle 410 equipped with the parking control apparatus 110 and the search apparatus 120 has searched a space to park the vehicle will be described in more detail with reference to FIGS. 5(A) and 5(B).

Referring to FIGS. 5(A) and 5(B), when the vehicle 410 equipped with the parking control apparatus 110 obtains information for a space 430 to park the vehicle 410 through the search apparatus 120, the parking control apparatus 110 equipped in the vehicle 410 performs a control such that a space image 430' of the searched space 430 is displayed on the screen 500 of the display apparatus 130. In addition, the parking control apparatus 110 performs a control such that an object image 410' of the vehicle 410 equipped with the search apparatus 120 is displayed on the screen 500 of the display apparatus 130, and also performs a control such that information for parked vehicle 420 or 440, which is obtained from the search apparatus 130, is also displayed at the left and right sides of the searched space 430 on the screen 500 of the display apparatus 130 as two object images 440' and 420'. At this time, the parking control apparatus 110 also performs a control such that the space image 430' is placed and displayed between the two object images 440' and 420', and performs a control such that identification information 510 corresponding to the space image 430' displayed on the screen 500 of the display apparatus 130 is also displayed on the screen 500 of the display apparatus 130. The identification information 510 may be displayed as at least one of an inherent figure, a symbol, an image, and a color. FIG. 5(B) exemplifies an example in which parking control apparatus 110 performs a control such that "#1" is displayed on the screen 500 of the display apparatus 130 for the first searched space 430. Hereinafter, a situation in which the searched space 430 is selected as a space to actually park the vehicle 410 and the vehicle 410 is parked in the space 430 will be described in more detail with reference to FIGS. 6(A) and 6(B).

Referring to FIGS. 6(A) and 6(B), when the driver of the vehicle 410 equipped with the parking control apparatus 110 and the search apparatus 120 selects the space 430 (Space 1) searched through the search apparatus 120 as a space to actually park the vehicle, the parking control apparatus 110 of the vehicle 410 performs a control such that the object image 410' of the actual vehicle 410 to be parked is displayed on the screen 500 of the display apparatus 130, selects the searched space 430 (Space 1) as the space to actually parked the vehicle 410 by receiving driver selection information from the display apparatus 130, and performs a control such that the space image 430' of the space to park the vehicle 410 and the object images 440' and 420' of the parked vehicles disposed on the opposite sides of the space image 430' are displayed on the screen 500 of the display apparatus 130. In addition, the parking control apparatus 110 performs a control such that a direction for moving and parking the vehicle 410 is indicated as an arrow on the screen 500 of the display apparatus 130. When the vehicle moves in the reverse direction for parking, the parking control apparatus 110 performs a control such that a symbol or image including "R" is displayed on the screen 500 of the display apparatus 130.

Although a situation in which the searched space 430 is selected as a space to actually park the vehicle 410, and the vehicle 410 is parked thereon has been described above, a situation in which the vehicle 410 searches another space without selecting the searched space 430 will be described in more detail with reference to FIGS. 7(A) and 7(B).

Referring to FIGS. 7(A) and 7(B), when the vehicle 410 equipped with the parking control apparatus 110 and the search apparatus 120 searches another space 450 (Space 2) other than the searched space 430 (Space 1) after passing by the searched space 430 without selecting the searched space 430 as the actual parking space, the vehicle 410 equipped with the parking control apparatus 110 searches a space around the vehicle 410 through the search apparatus 120. At this time, when the vehicle 410 is continuously searching a parking space since the parking control apparatus 110 does not obtain information for the parking space through the search apparatus 120, the parking control apparatus 110 equipped in the vehicle 410 performs a control such that only the three object images and the object image of the vehicle 410 which is equipped with the search apparatus 120 to search the space are displayed on the image display region of the screen 500 of the display apparatus 130.

Here, the three object images 440' displayed on the image display region of the screen 500 of the display apparatus 130 may be images for the actually parked vehicles or images for the objects recognized in the space search procedure.

Hereinafter, a situation in which the vehicle 410 equipped with the parking control apparatus 110 and the search apparatus 120 has searched another parking space 450 (Space 2) will be described in more detail with reference to FIGS. 8(A) and 8(B).

Figure 8:
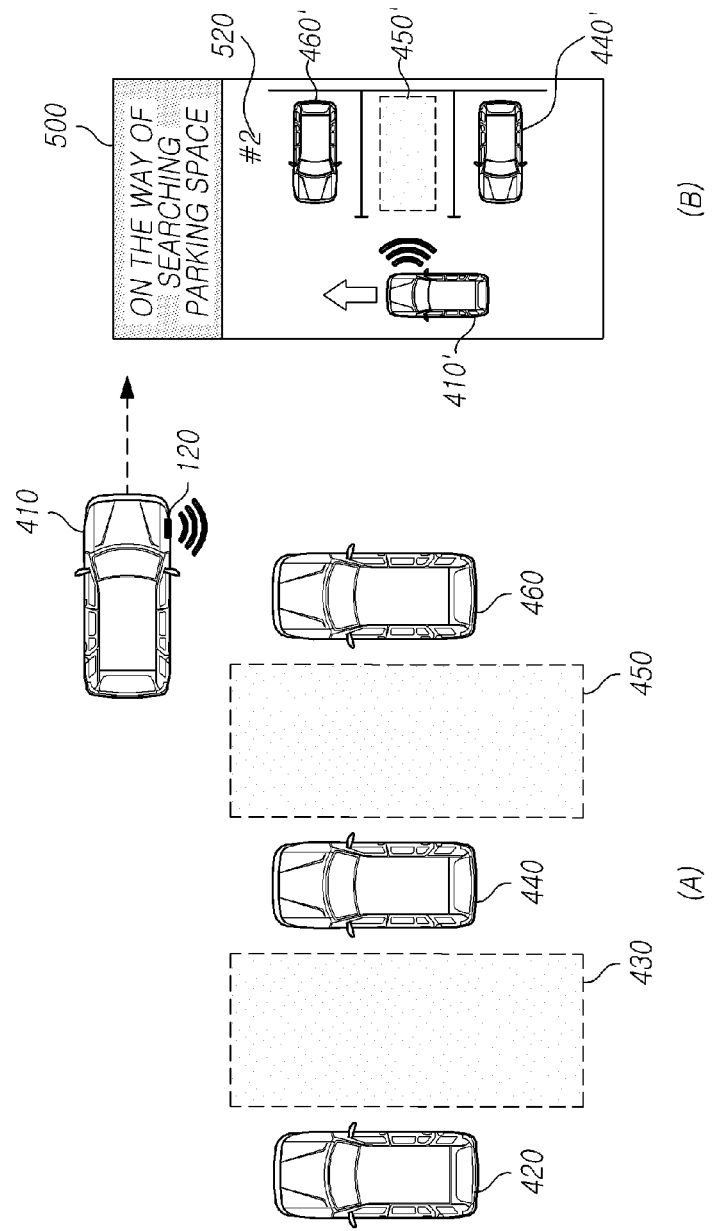
Figure 9:
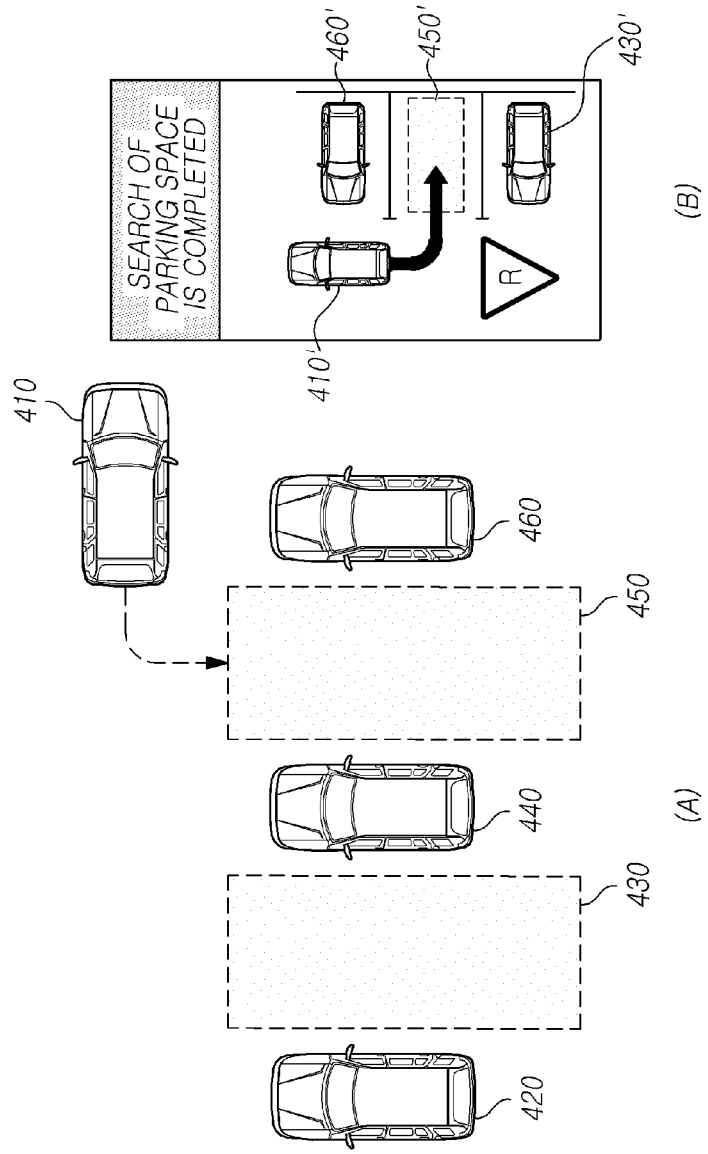

Referring to FIG. 8, when the vehicle 410 equipped with the parking control apparatus 110 obtains information for another parking space 450 (Space 2) through the search apparatus 120 after passing by the previously searched space 430 (Space 1), the parking control apparatus 110 equipped in the vehicle 410 performs a control such that a space image 450' for the newly searched parking space 450 (Space 2) is displayed on the screen 500 of the display apparatus 130. In addition, the parking control apparatus 110 performs a control such that the object image 410' of the vehicle 410 equipped with the search apparatus 120 on the screen 500 of the display apparatus 130, and also performs a control such that the information of the vehicles 440 and 460 parked on left and right sides of the searched parking space 450 (Space 2), which is obtained from the search apparatus 130, is also displayed on the screen 500 of the display apparatus 130 as two object images 440' and 460'. At this time, the parking control apparatus 110 performs a control such that the space image 450' are disposed and displayed between the two object images 440' and 460', and also performs a control such that identification information 520 corresponding to the space image 450' displayed on the screen of the display apparatus is also displayed on the screen 500 of the display apparatus 130. The identification information 520 may be displayed as at least one of, for example, an inherent figure, a symbol, an image, and a color.

Here, the newly searched space 450 (Space 1) is a space different from the previously searched space 430 (Space 2), and when parking control apparatus 110 performs a control such that identification information is allocated to each of the spaces and displayed on the screen 500 of the display apparatus 130, the driver may discriminate each of the plurality of parkable spaces through the screen 500 of the display apparatus 110. Thus, the driver may select a space to park the vehicle 410 and park the vehicle 410 therein. FIGS. 8(A) and 8(B) exemplify an example in which the parking control apparatus 110 performs a control such that "#2" is indicated on the screen 500 of the display apparatus 130 for the newly searched space 450.

A situation in which the space 450 (Space 2) searched in the above-described situation is selected as a space to actually park the vehicle 410 and the vehicle 410 is parked therein will be described in more detail with reference to FIGS. 9(A) and 9(B).

Referring to FIGS. 9(A) and 9(B), when the driver of the vehicle 410 equipped with the parking control apparatus 110 and the search apparatus 120 selects the space 450 (Space 2) searched through the search apparatus 120 as a space to actually park the vehicle 410, the parking control apparatus 110 of the vehicle 410 performs a control such that the object image 410' of the vehicle 410 to be actually parked is displayed on the screen 500 of the display apparatus 130, selecting the searched space 450 (Space 2) as the space to actually park the vehicle 410 by receiving an input of driver selection information from the display apparatus 130, and performs a control such that the space image 450' of the space 450 to park the vehicle, and the two object images 440' and 460' of the parked vehicles 440 and 460 disposed on the both sides of the space image 450' are displayed on the screen 500 of the display apparatus 130. Further, the parking control apparatus 110 performs a control such that an arrow indicating a direction of moving and parking the vehicle 410 is displayed on the screen 500 of the display apparatus 130, and when the vehicle 410 is parked in reverse moving, the parking control apparatus 110 performs a control such that a symbol or image including "R" is displayed on the screen 500 of the display apparatus 130.

As described above, according to the present invention, a parking control apparatus, a parking control method, and a parking control system which may guide a driver on a plurality of spaces searched on a parking space search procedure.

Even if it was described above that all of the components of an embodiment of the present invention are coupled as a single unit or coupled to be operated as a single unit, the present invention is not necessarily limited to such an embodiment. At least two elements of all structural elements may be selectively joined and operate without departing from the scope of the present invention. Although the embodiments of the present invention have been described for illustrative purposes, those skilled in the art will appreciate that various modifications, additions and substitutions are possible, without departing from the scope and spirit of the invention. The scope of the present invention shall be construed on the basis of the accompanying claims in such a manner that all of the technical ideas included within the scope equivalent to the claims belong to the present invention.

What is claimed is:

1. A parking control apparatus comprising:
a space search unit configured to search a space to park a vehicle;
a searched space management unit configured to allocate identification information to the searched space; and
a parking space selection unit configured to select the searched space as a parking space to actually park the vehicle,
wherein the space search unit searches for another space to park the vehicle when the searched space is not selected,
wherein the identification information is allocated to correspond to each of the searched spaces,
wherein the identification information is at least one of an identification number which is allocated to at least one of the searched spaces in order based on the searched order of the searched spaces, and
wherein the searched space management unit performs a control such that space images for the searched spaces are displayed on separate screen pages of a display apparatus as the vehicle moves and performs a control such that each of the identification information allocated to correspond to each of the searched spaces is further displayed on the display apparatus in a corresponding screen page.

2. The parking control apparatus of claim 1, wherein the space search unit is configured to recognize an object around the vehicle through a search apparatus and to search one or more spaces based on a result of recognizing the object.

3. The parking control apparatus of claim 1, wherein the parking space selection unit selects the parking space by receiving an input of driver selection information for the one of the searched spaces from the display apparatus.

4. The parking control apparatus of claim 1, wherein, when the space is searched and then the other space is searched by the space search unit, the parking space selection unit suppresses the previously searched space from being selected as the parking space.

5. The parking control apparatus of claim 1, wherein a plurality of spaces are searched.

* * * * *

UNITED STATES PATENT AND TRADEMARK OFFICE
CERTIFICATE OF CORRECTION

PATENT NO. : 9,520,063 B2  Page 1 of 1
APPLICATION NO. : 14/306901
DATED : December 13, 2016
INVENTOR(S) : Tae Bong Noh It is certified that error appears in the above-identified patent and that said Letters Patent is hereby corrected as shown below:

On the Title Page

Please add:
--[30] Foreign Application Priority Data
August 23, 2013   (KR)   10-2013-0100291--

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*